(12) United States Patent
Kurokawa et al.

(10) Patent No.: US 9,042,731 B2
(45) Date of Patent: May 26, 2015

(54) OPTICAL MODULE HAVING A PLURALITY OF OPTICAL SOURCES

(71) Applicant: Sumitomo Electric Industries, Ltd., Osaka-shi (JP)

(72) Inventors: Munetaka Kurokawa, Yokohama (JP); Yasushi Fujimura, Yokohama (JP); Kazunori Tanaka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 164 days.

(21) Appl. No.: 13/712,497

(22) Filed: Dec. 12, 2012

(65) Prior Publication Data

US 2013/0148966 A1    Jun. 13, 2013

(30) Foreign Application Priority Data

Dec. 13, 2011  (JP) ................................ 2011-272342
May 28, 2012  (JP) ................................ 2012-121270

(51) Int. Cl.
| | |
|---|---|
| *H04J 14/02* | (2006.01) |
| *G02B 6/00* | (2006.01) |
| *H04B 10/50* | (2013.01) |
| *H04J 14/06* | (2006.01) |
| *G02B 6/42* | (2006.01) |

(52) U.S. Cl.
CPC .............. *H04J 14/02* (2013.01); *H04B 10/506* (2013.01); *H04J 14/06* (2013.01); *G02B 6/4213* (2013.01); *G02B 6/4215* (2013.01)

(58) Field of Classification Search
CPC ............................... H04J 14/06; H04B 10/506
USPC ........................................................... 398/91
See application file for complete search history.

(56) References Cited

U.S. PATENT DOCUMENTS

| | | | |
|---|---|---|---|
| 6,198,864 B1 | 3/2001 | Lemoff et al. | |
| 6,396,978 B1 | 5/2002 | Grann | |
| 6,563,976 B1 | 5/2003 | Grann et al. | |
| 6,908,461 B2 * | 6/2005 | Momiuchi et al. | 606/10 |
| 2012/0148192 A1 | 6/2012 | Nakanishi | |

FOREIGN PATENT DOCUMENTS

JP         2005-140960 A      6/2005
WO      WO 2011059107 A1 *   5/2011

\* cited by examiner

*Primary Examiner* — Leslie Pascal
(74) *Attorney, Agent, or Firm* — Venable LLP; Michael A. Sartori; F. Brock Riggs

(57) ABSTRACT

An optical module that outputs a wavelength multiplexed optical signal is disclosed. The optical module provides at least first to third optical source, a wavelength multiplexer, a polarization rotator, and a polarization multiplexer. The optical sources each outputting first to third optical signals with a wavelength different from others. The wavelength multiplexer multiplexes the first optical signal with the third optical signal. The polarization rotator rotates the polarization vector of one of the multiplexed first and third optical signals and the second signal by substantially 90°. The polarization multiplexer multiplexes the polarization rotated optical signal with the second optical signal.

16 Claims, 15 Drawing Sheets

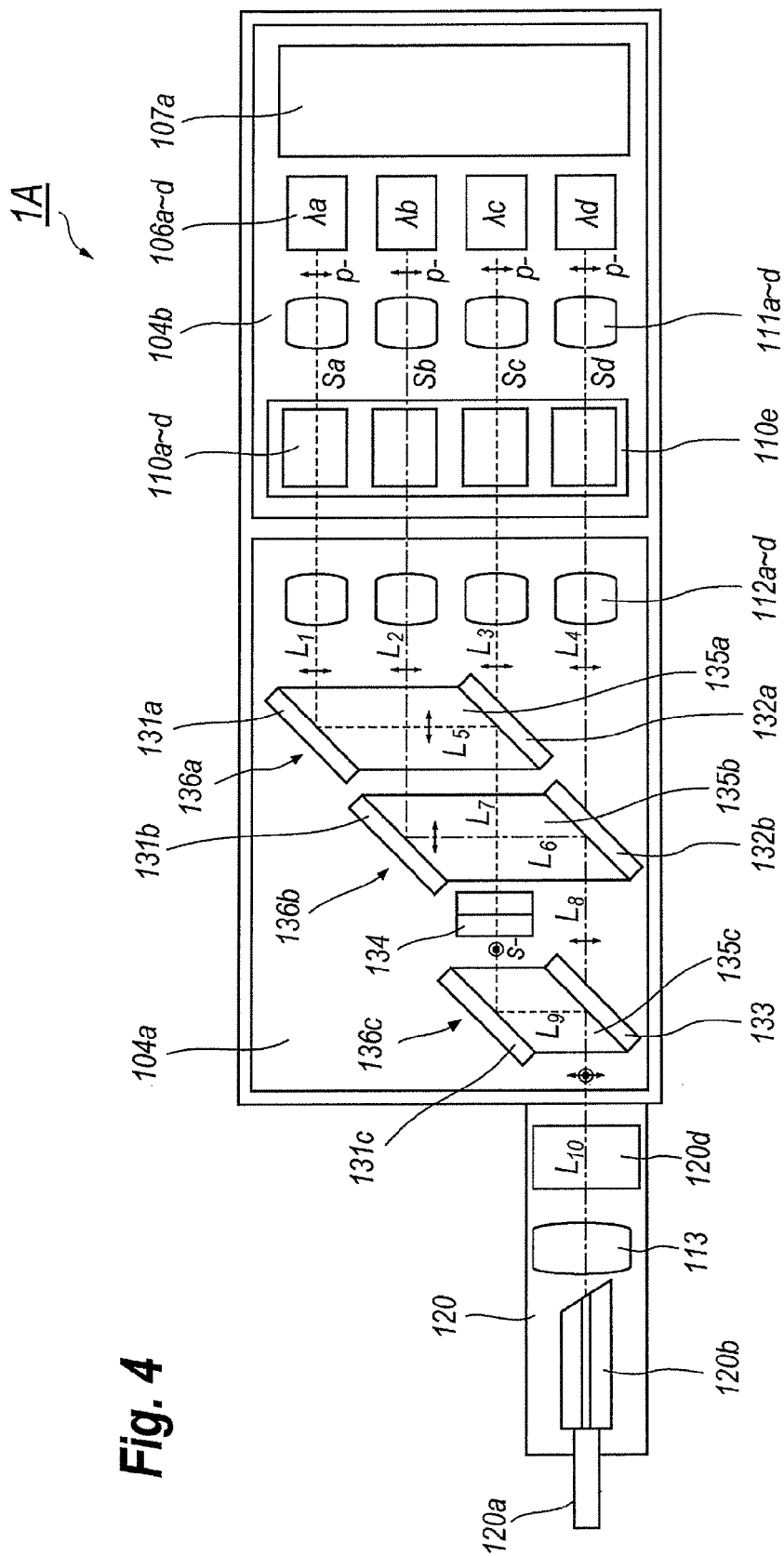

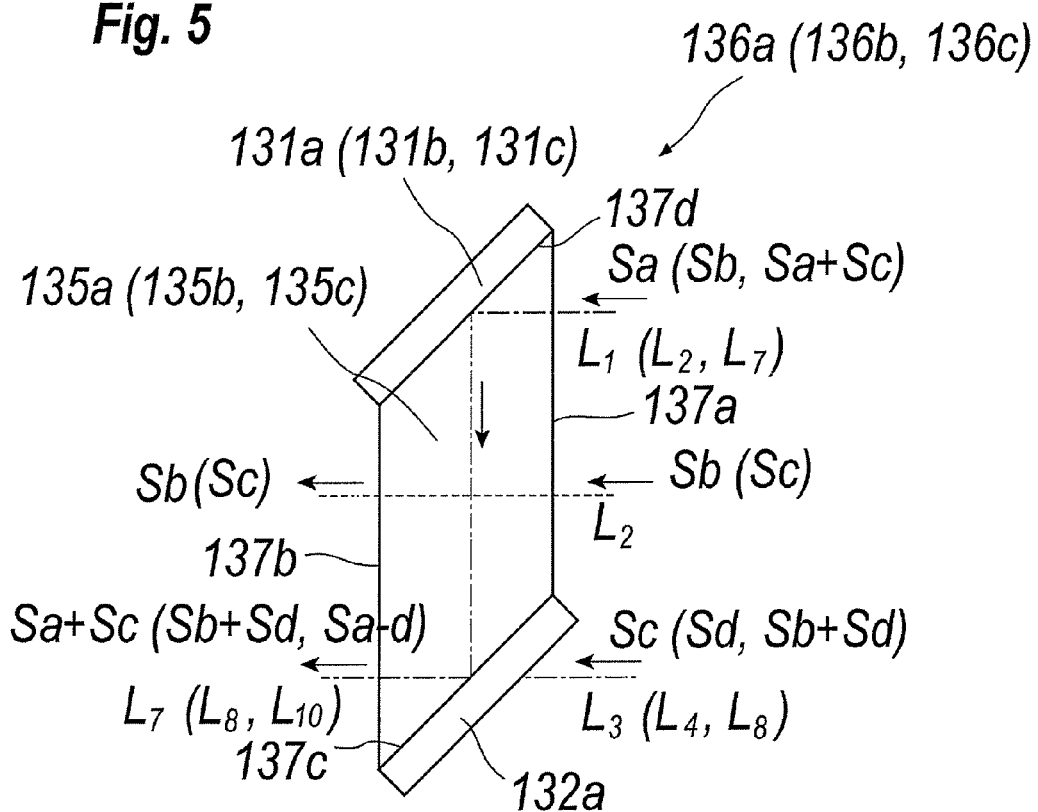

OPTICAL MODULE HAVING A PLURALITY OF OPTICAL SOURCES

BACKGROUND OF THE INVENTION

1. Field of the Invention

The present invention relates to an optical module, in particular, the invention relates to an optical module having a plurality of optical signal sources and outputting a multiplexed optical signal that multiplexes optical signals each emitted from respective optical signal sources.

2. Related Background Arts

The transmission quantity to be transmitted by a single fiber has been expanding year after year. The transmission capacity per a fiber has become 40 Gbps, 100 Gbps, or higher in the Metro/Access Network System. The wavelength division multiplexing (WDM) has been known as one of key technologies to enhance the transmission capacity. The WDM system multiplexes a plurality of optical signals each attributed to a wavelength different from others. According to a draft of the LAN-WDM standard, which is now drawing; four optical signals each having a transmission speed per a wavelength of 25 Gbps and a span of 800 GHz are multiplexed to realize the transmission capacity of 100 Gbps. The wavelengths of respective optical signals are 1295.56, 1300.05, 1304.58 and 1309.14 nm. An optical transceiver ruled in the LAN-WDM draft has outer dimensions following a multi-source agreement (MSA) of the CFP (100 G form factor pluggable). However, further downsizing of the optical transceiver is strongly requested to install optical transceivers in high-density within a communication apparatus.

SUMMARY OF THE INVENTION

An aspect of the present application relates to an optical module. The optical module includes first to third optical sources, a wavelength multiplexer, a polarization rotator, and a polarization multiplexer. The first to third optical sources output first to third optical signals each having one of first to third wavelengths different from others and a polarization vector substantially same to each other, where the first wavelength is the shortest while the third wavelength is the longest. The wavelength multiplexer generates a multiplexed optical signal by transmitting one of the first and third optical signals, and reflecting another of the first and third optical signals. The wavelength multiplexer has a cut-off wavelength around the second wavelength. The polarization rotator rotates the polarization vector of one of the multiplexed optical signal and the second optical signal by substantially 90°. The polarization multiplexer multiplexes the second optical signal with the multiplexed optical signal by transmitting one of the second optical signal and the multiplexed optical signal, and reflecting another of the second signal and the multiplexed optical signal.

The optical module according to the invention further includes an optical reflector that reflects one of the first and third optical signals toward the wavelength multiplexer, and a further feature of the optical module is that the optical reflector is integrated with the wavelength multiplexer by putting a block therebetween to form an intermediate assembly.

The wavelength multiplexer and/or the polarization multiplexer have a base whose plane shape is parallelogram with four sides, where two of sides makes an angle substantially equal to the Fresnel refraction angle of an optical signal entering the base. The optical signal entering the base in a center of one side of the parallelogram and output from a center of another side facing the former side of the parallelogram, even the incident angle of the optical signal to the base is set substantially 45° with respect to the side of the base.

BRIEF DESCRIPTION OF THE DRAWINGS

The foregoing and other purposes, aspects and advantages will be better understood from the following detailed description of a preferred embodiment of the invention with reference to the drawings, in which:

FIG. 4 shows an optical circuit modified from those shown in FIG. 2, where the modified optical circuit provides some intermediate assemblies integrating the optical reflector, the wavelength multiplexer and/or the polarization multiplexer with a transparent block;

FIG. 5 is a plan view of an intermediate assembly implemented within the optical module shown in FIG. 4;

DESCRIPTION OF PREFERRED EMBODIMENTS

Next, some embodiments according to the present invention will be described as referring to drawings. In the description of the drawings, numerals or symbols same or similar to each other will refer to elements same or similar to each other without overlapping explanations.

Figure 1:
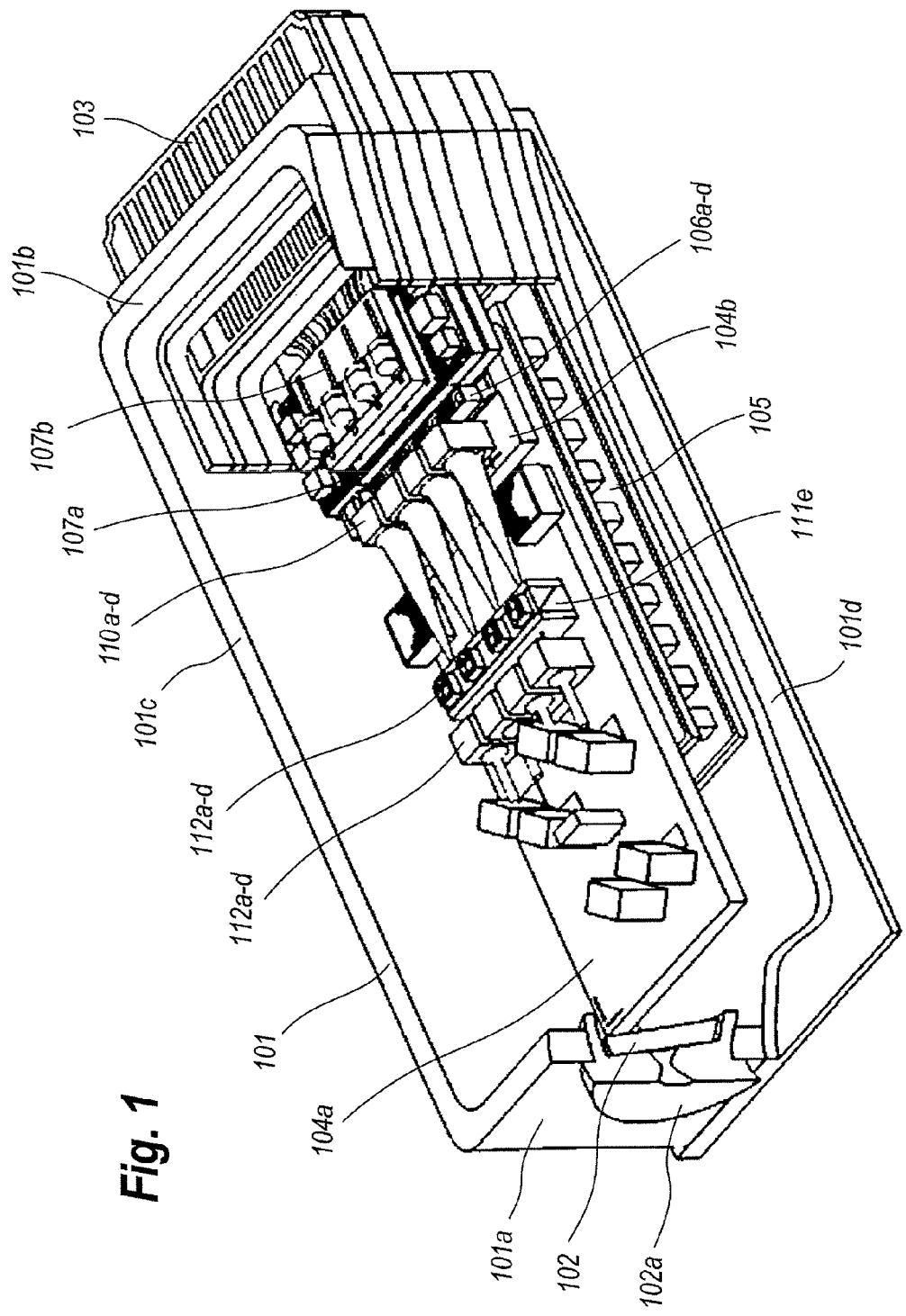
FIG. 1 is a perspective view of an optical module according to an embodiment of the present invention.
Figure 2:
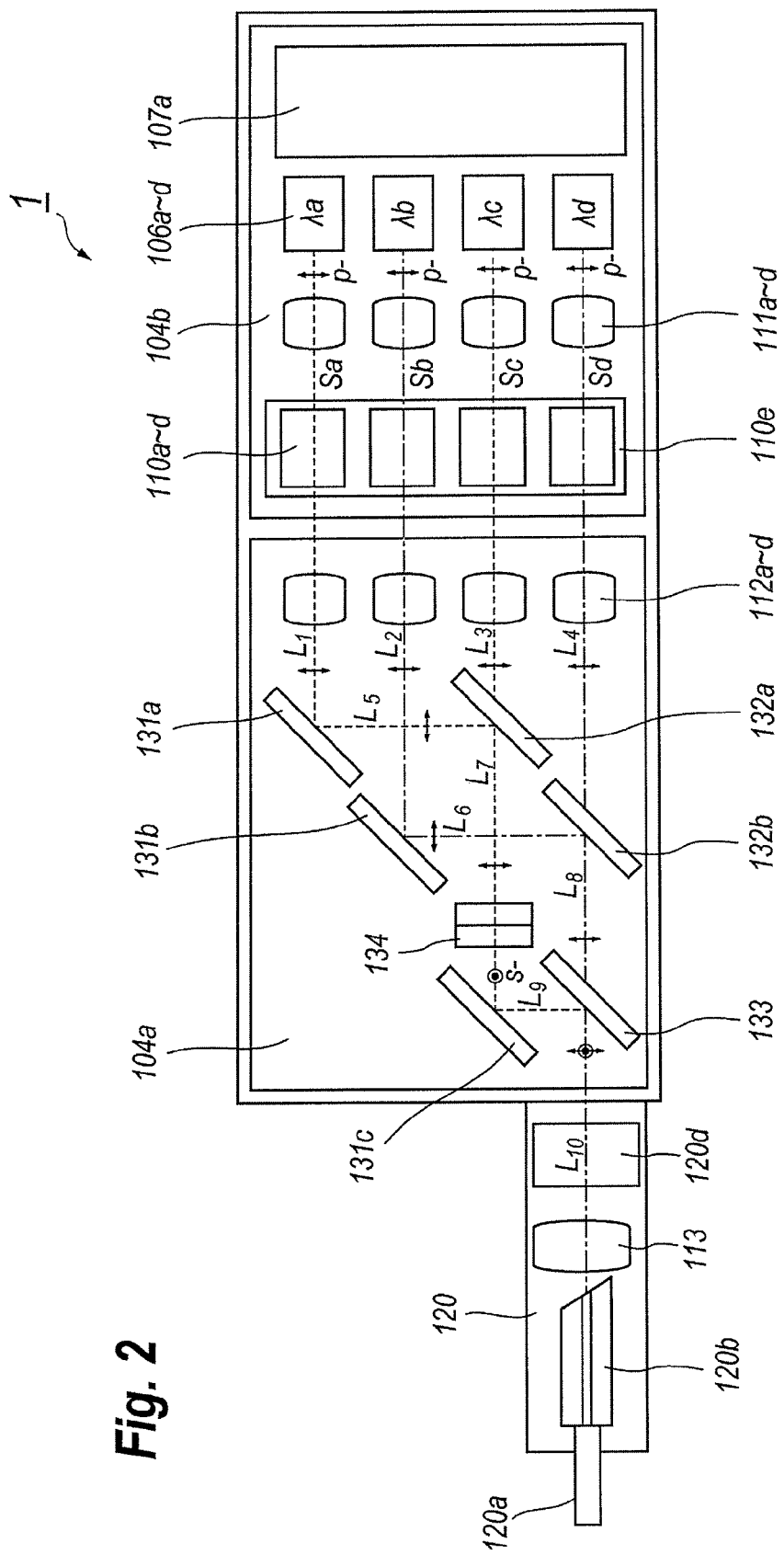
FIG. 2 shows an optical circuit implemented within the optical module shown in FIG. 1.

FIG. 1 is a partially cutaway view of an optical module according to the first embodiment of the invention. The optical module 1 shown in FIG. 1 includes a housing 101 constituting a front wall 101a, a rear wall 101b, side walls, 101c, and a bottom 101d. The front wall 101a fixes a window 102 through a window holder 102a to seal the inside of the housing 101 air-tightly. Referring to FIG. 2, which schematically illustrates the optical circuit of the module, an optical coupling unit 120 is assembled with the window holder 102a in the outside of the housing 101. The rear wall 101b provides an electrical plug 103 on a multi-layered ceramics, to communicate electrically with an apparatus provided in the outside of the optical module 1. The description provided below assumes for the explanation sake that the front as a side where the window 102 is formed, the rear as a side where the electrical plug 103 is formed; but the front and/or rear should not narrower a scope of the present invention.

The bottom 101d mounts a thermo-electric cooler (hereafter denoted as TEC) 105, typically, a Peltier Device, thereon. The TEC 105 mounts the first base 104a, and this first base 104a mounts an optical circuit to couple a plurality of optical sources with a single external fiber. The TEC 105 further mounts the second base 104b thereon, where the second base 104b mounts a plurality of semiconductor laser diodes (hereafter denoted as LD), 106a to 106d, via respective submounts as optical sources independent from others. The optical signals, Sa to Sd, each output from the LDs, 106a to 106d, are concentrated by first lenses, 111a to 111d, and partially detected by respective photodiodes (hereafter denoted as PD), 110a to 110d, each mounted on the second base 104b. Specifically, the PDs, 110a to 110d, are mounted on an optical beam splitter (hereafter denoted as BS) 110e that splits each of optical signals, Sa to Sd, by about 5% to respective PDs, 110a to 110d.

Mounted behind the LDs, 106a to 106d, are a driver circuit 107a to drive the LDs, 106a to 106d. This driver circuit 107a is also mounted on the second base 104b; specifically, the second base 104b first mounts a spacer made of silicon (Si) slab and this spacer mounts the driver circuit 107a, which is also made of Si. Moreover, the driver circuit 107a mounts a substrate 107b putting an insulating slab made of glass in the present embodiment therebetween. The substrate 107b provides interconnections to provide bias supplies to the LDs, 106a to 106d, and capacitors to eliminate noises with high frequency components.

Referring to FIG. 1, the optical signals, Sa to Sd, emitted from respective LDs, 106a to 106d, are concentrated by the first lenses, 111a to 111d. The beam waists by the first lenses, 111a to 111d, locate on the BS 110e. Portions of the optical signals, Sa to Sd, split by the BS 110e and not directing to the monitor PDs are converted to collimated beams by the second lenses, 112a to 112d, where they are mounted on the first base 104a. The beam waists by the second lenses, 112a to 112d, substantially locate on the first lenses, 111a to 111d. Thus, the first lenses, 111a to 111d, are the type of the condenser lens, while, the second lenses, 112a to 112d, are the type of the collimating lens.

FIG. 2 is a plan view of the optical circuit implemented within the optical module 1. The optical module 1 implements the LDs, 106a to 106d, of the type of, what is called, the edge emitting LD with an active layer extending in perpendicular to the edge thereof, namely, extending substantially in parallel to the primary surface thereof; accordingly, in parallel to the bottom 101d of the housing 101. Then, the polarization vector of the optical signals, Sa to Sd, emitted from the LDs, 106a to 106d, are in parallel to the bottom 101d of the housing 101, or in parallel to the page of FIG. 2. Taking the arrangements of optical components mounted on the first base 104a, the polarization vector of optical signals, Sa to Sd, are in parallel to the incident plane for optical reflectors, 131a to 131c, wavelength multiplexers (hereafter denoted as WM), 132a and 132b, and/or a polarization multiplexer (hereafter denoted as PM) 133, which is often called as the p-polarization.

The optical signals, Sa to Sd, each emitted from the LDs, 106a to 106d, have center wavelengths of $\lambda_a$=1295.56 nm, $\lambda_b$=1300.05 nm, $\lambda_c$=1304.58 nm, and $\lambda_d$=1309.14 nm, which follow the standard of the coarse wavelength division multiplexing (CWDM) system; and propagate along the optical axes, $L_1$ to $L_4$; concentrated by the first lenses, 111a to 111d, and enter the BS 110e. The BS 110e splits each of the optical signals into two parts, one of which has about 5% in the magnitude thereof and enters the PDs, 110a to 110d, while the other goes to the second lens, 112a to 112d. The BS 110e includes two prisms abutted against each other, and the optically reflecting surface between two prisms makes an angle of 45° against the surface of the second base 104b.

The optical signals, Sa to Sd, output from the BS 110e, further propagate along respective optical axes, $L_1$ to $L_4$, enter the second lenses, 112a to 112d, and are collimated to collimated beams. The optical signal Sa with the center wavelength of $\lambda_a$ enters the first reflector 131a, bent in the axis $L_1$ thereof by 90° to change the axis thereof into the $L_6$, and enters the first WM 132a. The second optical signal Sb with the center wavelength of $\lambda_b$ enter the second optical reflector 131b by the incident angle of 45° to change the axis $L_2$ thereof into the axis $L_6$ as bending by 90°, and enters the second WM 132b.

The third optical signal Sc with the center wavelength of $\lambda_c$ directly enters the first WM 132a by an incident angle of 45°, transmits therethrough to propagate along the axis $L_7$. On the other hand, the first optical signal Sa also enters the first WM 132a by the incident angle of also 45° along the optical axis $L_5$, but reflected thereat to bend the optical axis by 90° from $L_5$ to $L_7$, and multiplexed with the third optical signal Sc. Thus, the first WM 132a is set to make an angle of 45° with respect to the axes $L_3$ and $L_5$. The fourth optical signal Sd with the center wavelength of $\lambda_d$ directly enters the second WM 132b by the incident angle of 45°, transmits therethrough, and advances along the optical axis $L_8$. While, the second optical signal Sb, which is reflected by the second reflector 131b and advances along the optical axis $L_6$, enters the second WM 132b by the incident angle of 45°, reflected thereat to bend the optical axis by 90° from $L_6$ to $L_8$, and multiplexed with the fourth optical signal Sd. Thus, the second WM 132b is also set on the first base 104a to make the angle of 45° to the optical axes $L_4$ and $L_6$. The first and second reflectors, 131a and 131b; and the first and second WMs, 132a and 132b, do not affect the polarization status of the optical signals, Sa to Sd. That is, the optical signals, Sa to Sd, do not change the polarization status thereof by the transmission and/or the reflection by the reflectors, 131a and 131b, and the WMs, 132a and 132b. The multiplexed optical signals, Sa+Sc, advancing along the optical axis $L_7$, and the other multiplexed optical signals, Sb+Sd, advancing along the optical axis $L_8$, maintain the p-polarization status.

Figure 3A:
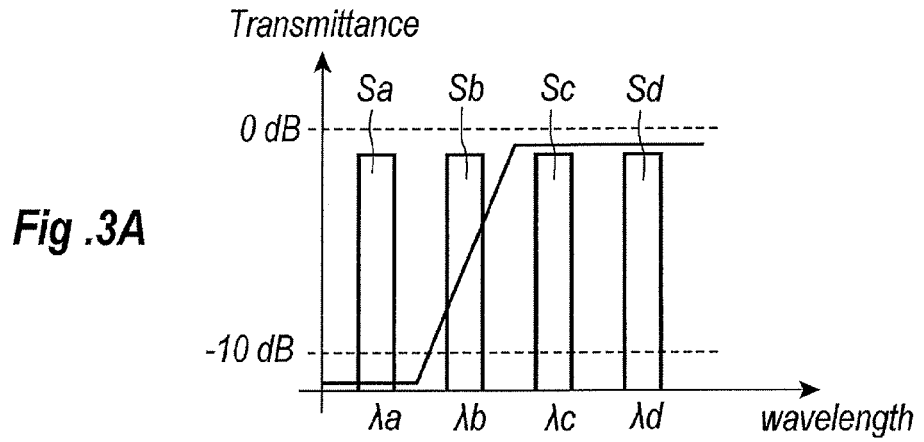
FIGS. 3A to 3C show optical transmittance of the optical reflector, the wavelength multiplexer, and the polarization multiplexer implemented in the optical module.
Figure 3B:
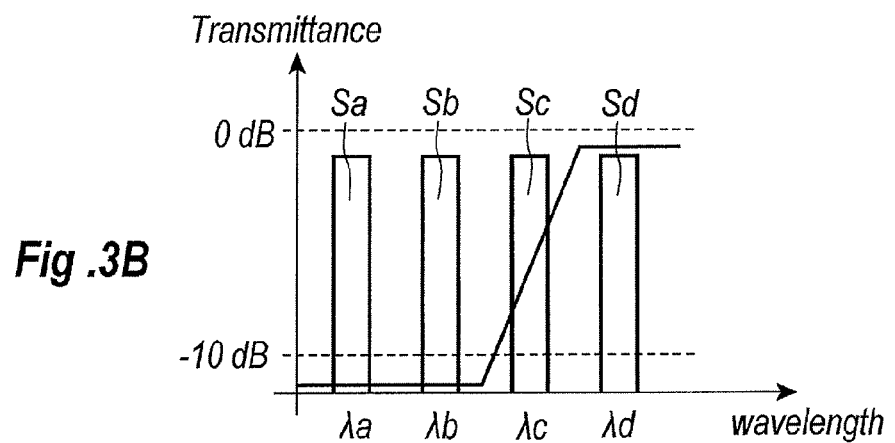

FIG. 3A schematically illustrates the optical transmittance of the first WM 132a for the optical signals, Sa and Sc; while, FIG. 3B schematically illustrates the optical transmittance of the second WM 132b for the optical signals, Sb and Sd. FIGS. 3A and 3B assume that the optical signals, Sa to Sd, enter respective WMs, 132a and 132b, by the incident angle of 45°. The first WM 132a shows, what is called, the high pass filter with the cut-off wavelength of around $\lambda_b$, that is, it shows the transmittance less than −10 dB for the first optical signal Sa with the center wavelength $\lambda_a$, then, the substantial part of the first optical signal Sa is reflected by the first WM 132a. On the other hand, the first WM 132a shows substantial transmittance of about 0 dB for the optical signal Sc with the center wavelength of $\lambda_c$, that is, the third optical signal Sc substantially transmits through the first WM 132a. Accordingly, the optical signal output from the first WM 132a contains the first optical signal Sa and the third optical signal Sc.

The second WM 132b is also the type of the high pass filter with the cut-off wavelength thereof around the third wavelength $\lambda_c$. Specifically, the second WM 132b has the transmittance less than −10 dB for the second wavelength $\lambda_b$, which means that the second optical signal Sb with the center wavelength of $\lambda_b$ is substantially reflected by the second WM 132b. On the other hand, the second WM 132b has the transmittance about 0 dB for the wavelength of about $\lambda_d$, which means that the fourth optical signal Sd with the center wavelength $\lambda_d$ substantially transmits the second WM 132b. Thus, the light output from the second WM 132b contains the second and fourth optical signals, Sb+Sd. One of distinguishable feature between the first and second WMs, 132a and 132b, is that the first WM 132a has the cut-off wavelength around the second wavelength $\lambda_b$, while, the second WM 132b has the cut-off wavelength around the third wavelength $\lambda_c$.

Referring to FIG. 2 again, the optical signals, Sa+Sc, output from the first WM 132a and advancing along the optical axis $L_7$ enter the polarization rotator (hereafter denoted as PR) 134. The PR 134 rotates the polarization status of the light input thereto by 90°, that is, the optical signals, Sa+Sc, changes the polarization status from the p-polarization to the s-polarization where the polarization direction is in perpendicular to the incident plane of the PM 134 and/or that of the third reflector 131c. Specifically, the optical signal output from the PR 134 and advancing along the optical axis $L_7$, which has the polarization vector in perpendicular to the page, reflected by the third reflector 131c by 90°, advances along the optical axis of $L_9$, and enters the PM 133. While, the light output from the second WM 132b advances along the optical axis $L_8$ and enters the PM 133 by the angle of 45°.

Figure 3C:
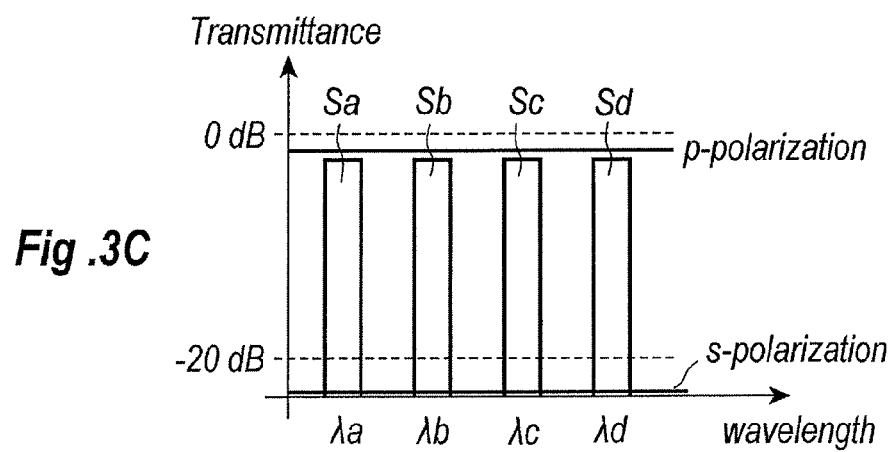

FIG. 3C schematically illustrates the transmittance of the PM 133 when the PM 133 is set by 45° with respect to the optical axes, $L_8$ and $L_9$. The PM 133 has the transmittance less than −20 dB for the optical signal with the s-polarization independent of the wavelength, that is, the optical signal with the polarization direction perpendicular to the incident plane is substantially reflected by the PM 133. On the other hand, the PM 133 has the transmittance of about 0 dB for the optical signal with the p-polarization independent of the wavelength, that is, the optical signal whose polarization direction is within the incident plane substantially transmits the PM 133. Thus, the optical signals, Sa+Sc, coming to the PM 133 along the optical axis $L_9$ is almost fully reflected toward the optical axis $L_{10}$, while, the optical signals, Sb+Sd, coming to the PM 133 along the optical axis $L_8$ fully transmit the PM 133 to advance along the optical axis $L_{10}$. Therefore, the light propagating along the optical axis $L_{10}$ contains all of the optical signals, Sa to Sd.

The optical signals, Sa to Sd, advancing along the optical axis $L_{10}$ transmits the optical isolator 120d and concentrated on an end of the external fiber 120a by the third lens 113. The optical isolator 120d, the third lens 113 and a ferrule 120b that secures a tip of the external optical fiber 120a are set in the coupling unit 120, where the coupling unit 120 is assembled to the front wall 101a of the housing 101. Because the optical signals, Sa to Sd, are converted into the collimated beam by the second lenses, 112a to 112d, the third lens 113 can focus the optical signals, Sa to Sd, on the end of the optical fiber 120a independent of the positions and the spaces between the optical components of the optical reflectors, 131a to 131c, the WMs, 132a and 132b, and the PM 133.

In the optical circuit described above, the optical reflectors, 131a to 131c, the WMs, 132a and 132b, and the PM 133 are mounted on the TEC 105 such that the temperatures thereof are kept in constant, which means that the optical characteristics, in particular, the fluctuation of the cut-off wavelength of the WMs and that of the transmittance/reflectance of the PM 133 between two polarization vectors may be extremely suppressed. Furthermore, the WMs, 132a and 132b, have the cut-off wavelength between alternate wavelengths not between neighbor wavelengths, which means that the cut-off performance of the WMs, 132a and 132b, may be moderated. Still further, the PDs, 110a to 110d, of the embodiment shown in FIG. 2 detect a portion of the front light of the LDs 106a to 106d, not the light emitted from the back facet of an LD, which means that the tracking error between them, the ratio of two beams emitted from the front facet and that from the back facet, is ignorable.

The driver circuit 107a of the embodiment to drive the LDs, 106a to 106d, integrates a plurality of circuits each independently driving the LDs, and this integrated circuit 107a is mounted on the TEC 105, which results in the stable operation of the driver circuit 107a. The bias circuit to bias the LDs, 106a to 106d, is set on the substrate arranged on the driver circuit 107a putting the insulating substrate therebetween. The substrate also mounts the capacitors to bypass the high frequency components superposed on the bias circuit, which can make an area where electronic components are assembled narrower to compact the housing 101 of the optical module 1.

FIG. 4 is a plan view of an optical module 1A that implements with an optical circuit modified from that shown in FIG. 2. The optical circuit of this modification includes some intermediate assemblies. Specifically, the first intermediate assembly 136a includes the first optical reflector 131a and the first WM 132a commonly assembled with a first block 135a; the second intermediate assembly 136b includes the second reflector 131b and the second WM 132b commonly assembled with a second block 135b; and the third intermediate assembly includes the third reflector 131c and the PM 133 assembled by interposing the third block 135c therebetween. In the arrangement of the optical module 1A shown in FIG. 4, the optical axes of $L_5$, $L_6$, and $L_9$ are within respective blocks, 135a to 135c. Accordingly, the optical blocks, 135a to 135c, are necessary to be made of material transparent for those optical signals, Sa, Sb, and Sc. In the present embodiment, the blocks, 135a to 135c, are made of silica glass transparent to all optical signals, Sa to Sd.

FIG. 5 describes the intermediate assemblies, 136a to 136c, in detail. The intermediate assembly 136a includes the block 135a with four sides, 137a to 137d, where they form a parallelogram plan view, and the first optical reflector 131a and the first WM 132a adhered to the sides, 137c and 137d, facing to each other. Two sides, 137a and 137d, and other two sides, 137b and 137c, each make an angle of 45°. The first optical signal Sa propagating along the optical axis $L_1$ enters the side 137a, reflected at the interface between the side 137d and the first reflector 131a, advances within the block 135a along the optical axis $L_5$, reflected at the interface between the side 137c and the first WM 132a, advances along the optical axis $L_7$, and output from the side 137b. The first reflector 131a provides the reflecting film on the surface adhered to the side 137d, and the first WM 132a also provides the wavelength selective reflection film on the surface adhered to the side 137c. The optical signal Sb enters the block 135a at the side 137a, advances within the block 137a, and output from the side 137b. Although the explanation above concentrates on the first intermediate assembly, the function and the explanation same with those above described are applied to the second and third intermediate assemblies.

Thus, the intermediate assemblies, 136a to 136c, make the optical alignment of the optical components considerably simple. The optical modules, 1 and 1A, of the embodiments provide on the first base 104a four second lenses, 112a to 112d, three optical reflectors, 131a to 131c, two WMs, 132a and 132b, the polarization rotator 134, and the PM 133, namely, totally eleven (11) components to be optically aligned to each other. The first to third intermediate assemblies, 136a to 136c, can reduce the number of components to be optically aligned to eight (8).

Figure 6:
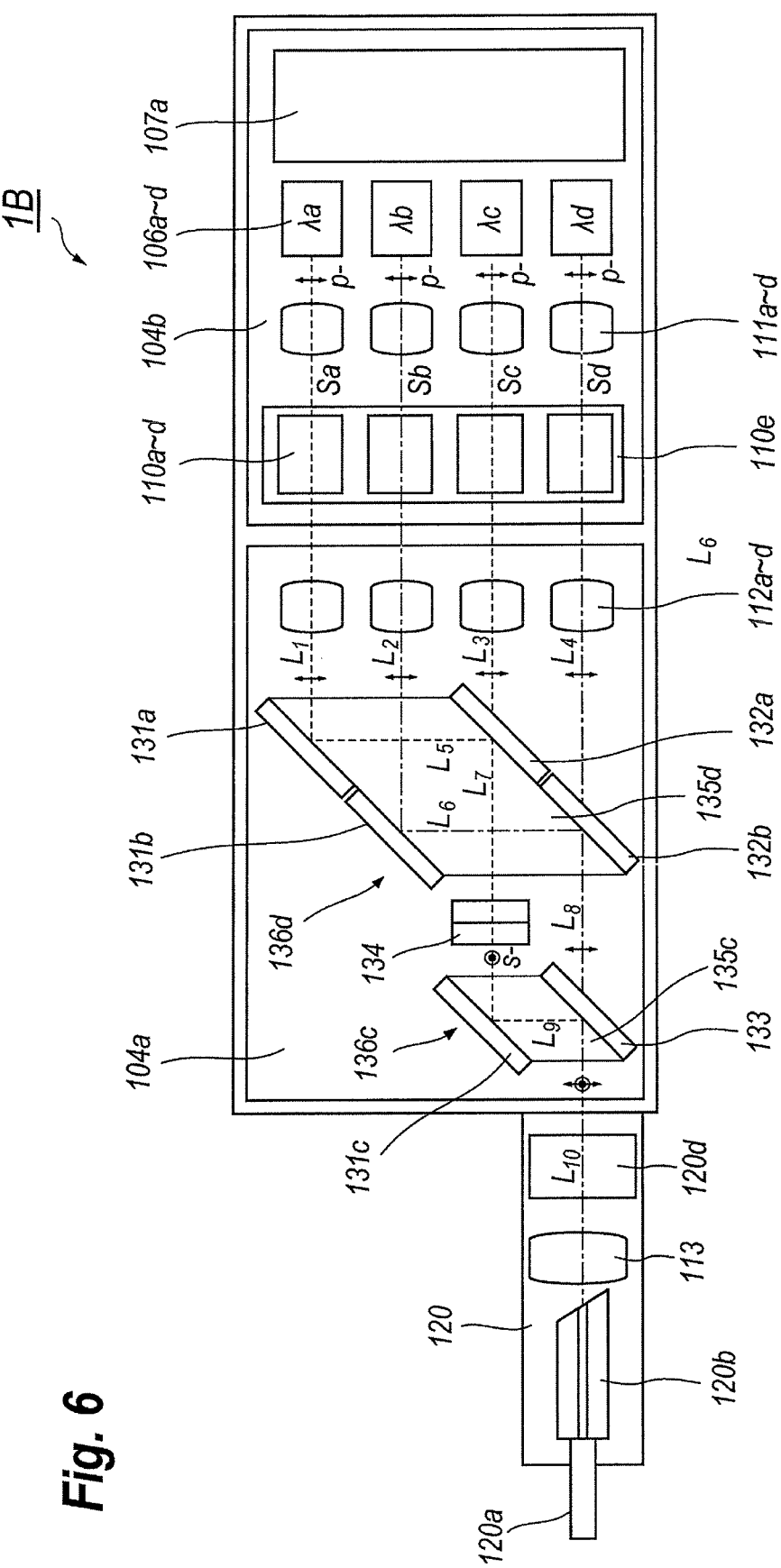
FIG. 6 shows an optical circuit that implements with a further modified intermediate assembly.

FIG. 6 is a plan view of still further modified optical module 1B. The optical module 1B shown in FIG. 6 has a distinguishable feature that two intermediate assemblies, 136a and 136b, in the former optical module 1A are integrated in the single body. That is, the optical module 1B includes two optical reflectors, 131a and 131b, and two WMs, 132a and 132b, where they are assembled via the only one block 135d to constitute the intermediate assembly 136d. The block 135d is made of material transparent for the wavelengths, λa to λd, typically, it is made of silica glass.

Figure 7:
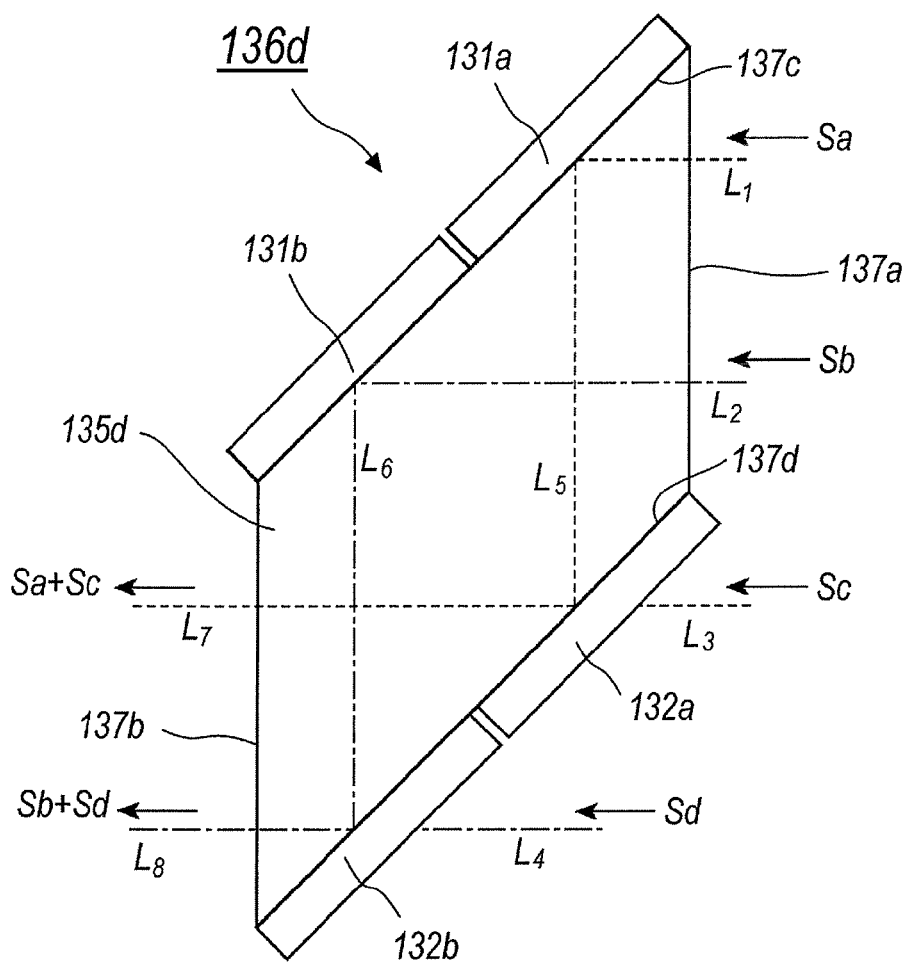
FIG. 7 shows details of the further modified intermediate assembly shown in FIG. 6.

FIG. 7 is a plan view of the intermediate assembly 136d implemented with the optical module 1B. The intermediate assembly 136d of the embodiment includes four sides, 137a to 137d, that form the plane shape of a parallelogram. The side 137c adheres with two optical reflectors, 131a and 131b, while, the side 137d facing the side 137c adheres with two WMs, 132a and 132b. Two sides, 137a and 137c, and other two sides, 137b and 137d, each make an angle of 45°. The optical signals, Sa and Sb, entering in the side 137a advance along respective optical axes, $L_1$ and $L_2$; the former Sa is reflected at the interface between the first optical reflector 131a and the side 137c, while, the other Sb is reflected at the interface between the side 137c and the second optical reflector 131b, bend the axes thereof by 90°; advance along the optical axes, $L_5$ and $L_6$, and reflected again at the interface between the side 137d and the first WM 132a, and between the side 137d and the second WM 132b. On the other hand, the third optical signal Sc, advancing along the optical axis $L_3$, enters the back surface of the first WM 132a, passes therethrough, multiplexed with the first optical signal Sa coming along the optical axis $L_5$, and output from the side 137b along the optical axis $L_7$. Moreover, the fourth optical signal Sd, entering the back surface of the second WM 132b, passes therethrough, multiplexed with the optical signal Sb coming along the optical axis $L_6$, and output from the side 137b along the optical axis $L_8$.

The block 135d of the present embodiment provides two optical reflectors, 131a and 131b, in the side 137c, and two WMs, 132a and 132b, in the side 137d of the parallelogram block 135d. Thus, the block 135d can omit the optical alignment between WMs, 132a and 132b. The number of components to be optically aligned is further reduced to seven (7) in the optical module 1B.

Figure 8:
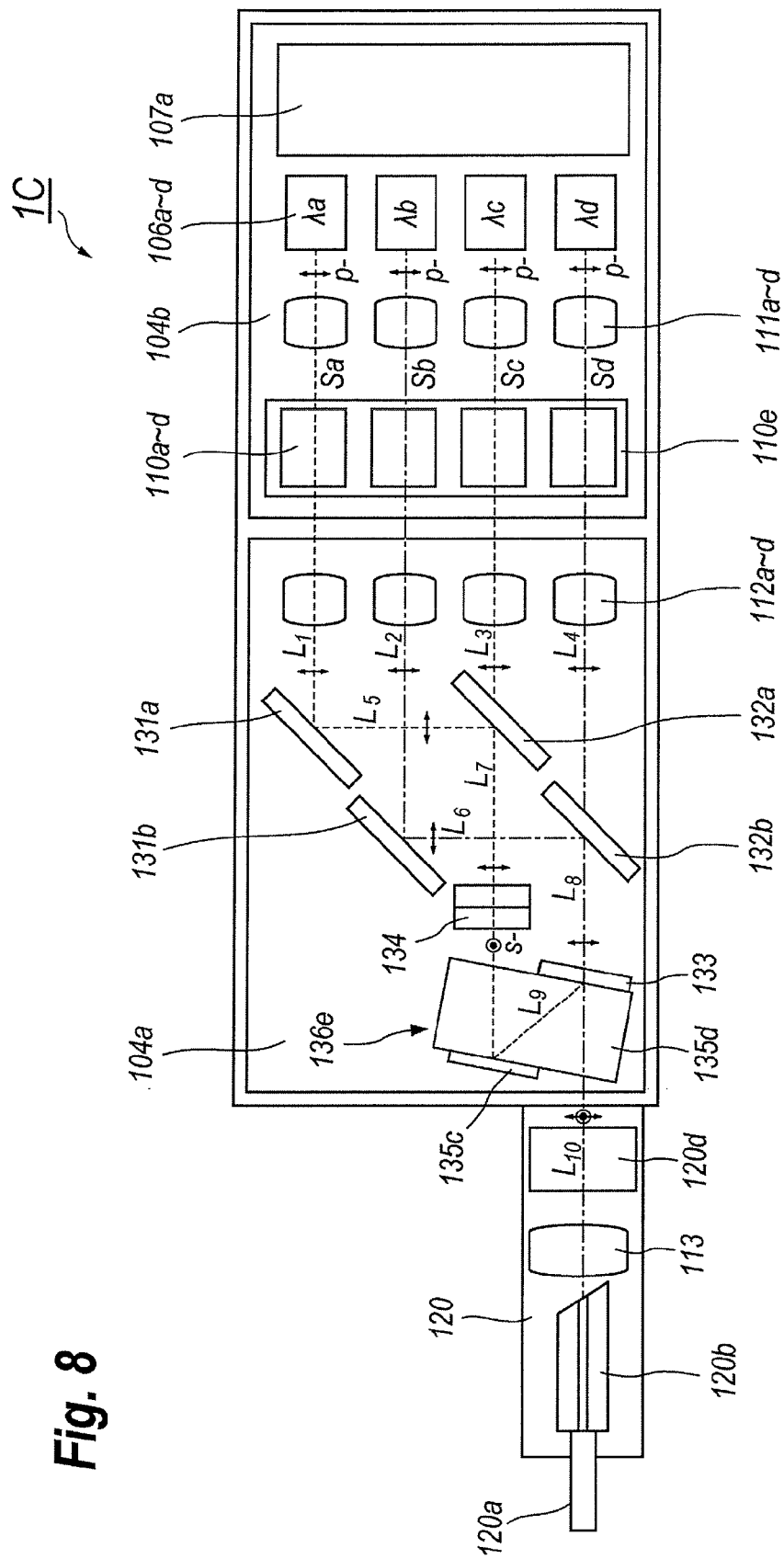
FIG. 8 shows an optical circuit that implements with still further modified intermediate assembly for the polarization multiplexer.

FIG. 8 is a plan view of still another optical module 1C. The optical modules, 1 to 1B, of the aforementioned embodiments provide the PM 133 where two optical beams, one of which includes two optical signals, Sa+Sc, while, the other includes another optical signals, Sb+Sd, each enter the PM 133 with an incident angle of 45°, where the incident angle is defined by the angle formed by the axis of the incident optical beam and the normal of the surface to receive the incident optical beam. The PM 133 with a type of multi-layered films is known that the performance to distinguish two polarization vectors degrades as the incident angle becomes large. As the incident angle of the optical beam entering the PM 133 becomes smaller, that is, as the optical beam is closer to the vertical incident, the performance to distinguish two polarizations enhances.

Figure 9:
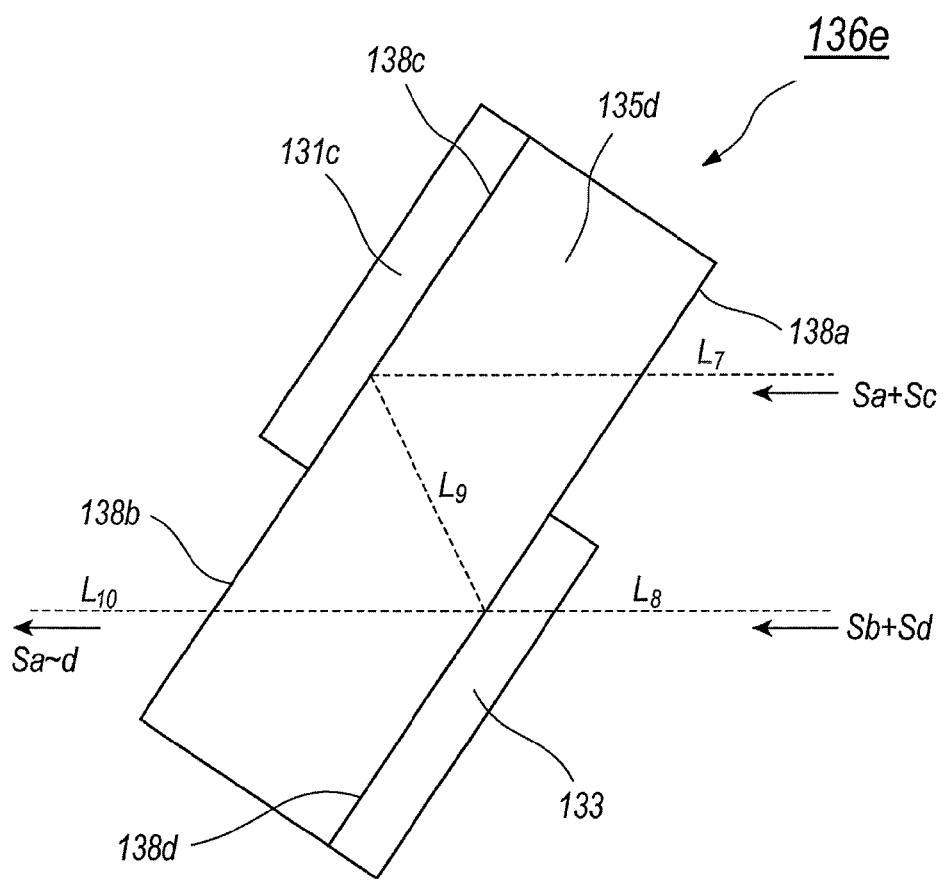
FIG. 9 shows details of still further modified intermediate assembly for the polarization multiplexer shown in FIG. 8.

The PM 133 of the embodiment shown in FIG. 8 sets the incident angle of the optical beams, Sa+Sc and Sb+Sd, less than 30°. Referring to FIG. 9, the fourth intermediate assembly 136e is described in detail. One of optical beams Sa+Sc, which advances along the optical axis $L_7$, enters the side 138a of the block 135d, reflected at the interface 138c between the side 138b and the third optical reflector 131c which is attached to the side 138b, advances along the optical axis $L_9$ toward the PM 133, reflected at the interface 138d between the side 138a and the PM 133 attached to the side 138a, and finally output from the side 138b where the third optical reflector 131c is attached. On the other hand, the other optical beam Sb+Sd enters from the back surface of the PM 133, passes therethrough, multiplexed with the optical beam Sa+Sb which is reflected by the third optical reflector 131c, and finally output from the side 138b.

The fourth intermediate assembly 136e shown in FIGS. 8 and 9 has a feature different from the third block 136c shown in FIGS. 4 and 6. That is, in the former block 135c, the side 137a to which the optical signal enters neighbors the side 137d to which the optical reflector 131c is attached; while in the present block 135d, the side 138a to which the optical signal enters faces the side 138b to which the optical reflector 131c is attached. The former arrangement is necessary for the optical signal, Sa+Sc or Sb+Sd, to enter the side 137a by a right angle. On the other hand, the side 138a of the optical module 1C is inclined with the optical axis $L_7$, which eliminates light Sa+Sc reflected thereat from returning the LDs, 106a to 106d.

When an active layer of an LD, which is active by being supplied with electrons and holes, is further supplied with external light, an additional optical status is newly induced within the active layer and this new optical state disarranges the optical state. That is, the external light induces optical noises. The light reflected at the side 137a of the block 135c returns to the LDs, 106a to 106d, along the optical axes, $L_7$ and $L_8$, and causes optical noises. The block 135d Shown in FIGS. 8 and 9 effectively prevents the reflected light from returning the LDs, 106a to 106d.

Moreover, in the fourth intermediate assembly 136e, the incident angle of the optical beams, Sa+Sc and Sb+Sd, to the PM 133 are set less than 45°, the performance to distinguish two polarization vectors of the PM 133, specifically, the ratio of the transmittance of the light with the p-polarization against that with the s-polarization becomes large. When the incident angle for the PM 133 is set smaller, the block 135d is necessary to be formed thick to secure the space between optical axes, $L_1$-$L_2$, $L_2$-$L_3$, and $L_3$-$L_4$.

Figure 10:
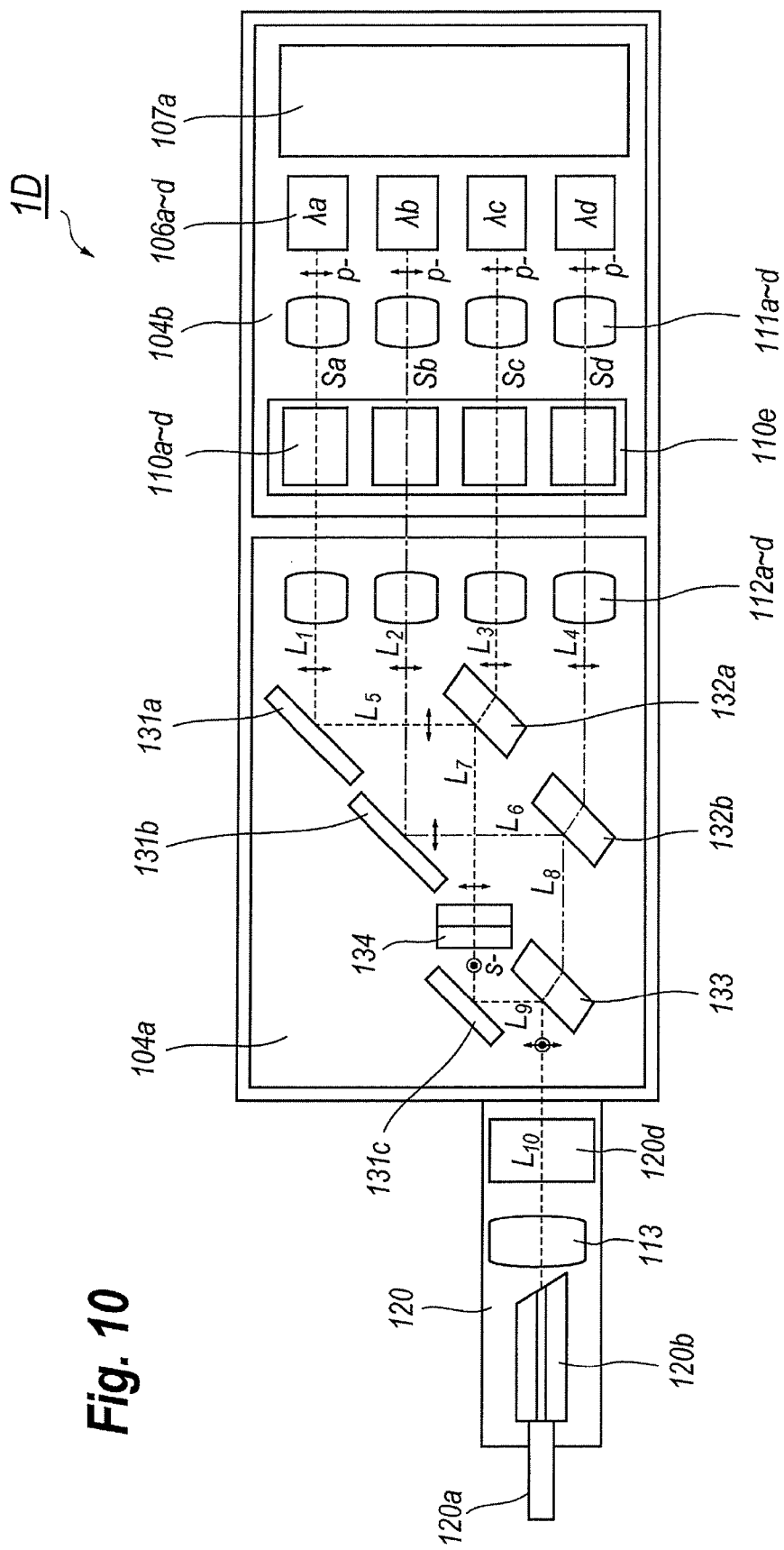
FIG. 10 shows an optical circuit that implement with modified wavelength multiplexers and a polarization multiplexer.
Figure 11A:
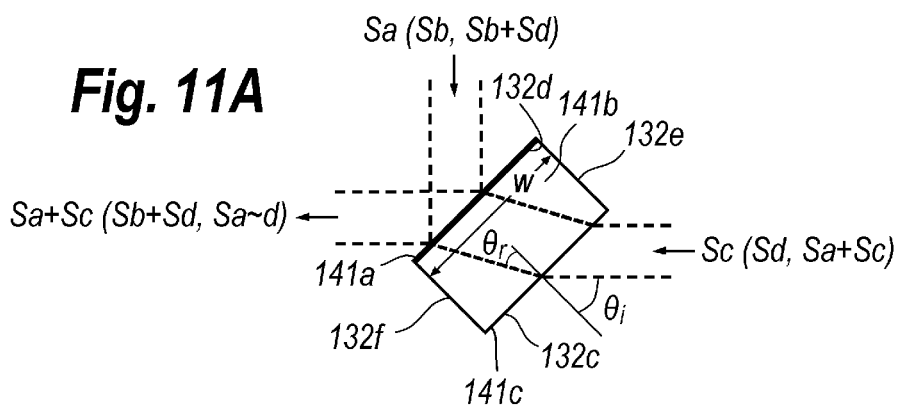
FIG. 11A shows a ray-trace for a conventional wavelength multiplexer.
Figure 11B:
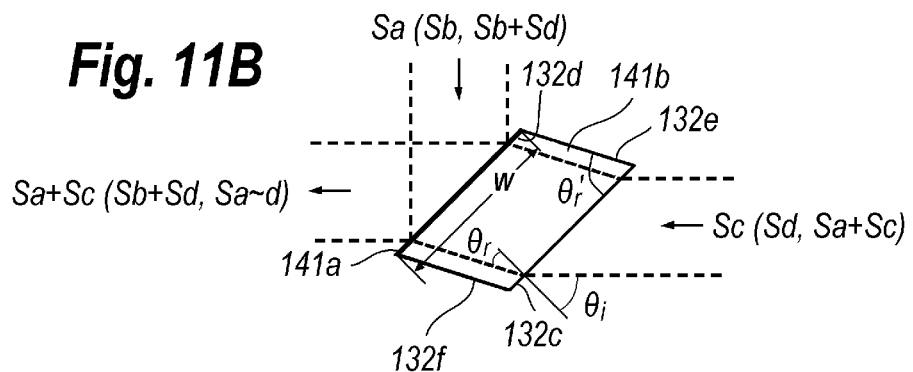
FIG. 11B shows a ray-trace for a modified wavelength multiplexer according to an embodiment of the present invention.

FIG. 10 is a plan view showing an arrangement of optical components on the first base 104a of still another optical module 1D. The optical module 1D has a feature that the WMs, 132a and 132b, have a plane shape different from those implemented within the aforementioned optical modules, 1 to 1C. FIGS. 11A and 11B compare two WMs. That is, the WM has a type of the optical filter with a cut-off wavelength including a multi-layered dielectric film 141a formed on a surface of a base 141b. Entering light on a surface 141c of the base 141b facing the surface to which the dielectric film is formed, the Fresnel refraction occurs at the surface 141c and the other surface facing the former surface, is which bends the optical axis twice as shown in FIGS. 11A and 11B, and the outgoing optical axis runs in parallel to the incident optical axis but leaves a slight offset therebetween.

When the base 141b is made of parallel plate and the incident optical beam enters substantially in a center of the surface 141c, the outgoing optical beam shifts from the center of the base 141b. The outgoing optical beam sometimes loses a portion thereof. Offsetting the incident optical beam from the center of the base 141b and/or thinning the base 141b, the possibility to lose a portion of the beam is decreased. But the efficiency to utilize the base 141b reduces, as shown in FIG. 11A.

FIG. 11B shows a plane shape of the WM 132a of the present embodiment. The WM 132a has a parallelogram shape including four sides, 132c to 132f. Angles $\theta_r'$ between two sides, 132c and 132e, and between two sides, 132d and 132f, are set to be 90° $-\theta_r(=90°-28°)$, where $\theta_r=28°$ corresponds to the Fresnel refraction angle when light enters the base 141b with the angle of 45°. The incident beam entering the side 132c in a center thereof is first refracted thereat, propagates within the base 141b by the Fresnel refraction angle of 28° with respect to the normal of the side 132c, refracted at the other side 132d to which the multi-layered dielectric film 141a is attached, and output from a center of the film 141a by an angle $\theta_i$ of 45°. The side 132d to which the dielectric film 141a is attached makes an angle of $\theta_r'$ of 90° $-\theta_r(=90°-28°)$ against the side 132f, the optical beam is output from the center of the dielectric film 141a even when the dielectric film has a lateral dimension w of 820 μm, which is same as that shown in FIG. 11A. Thus, the WM, 132a and 132b, and the PM 133 according to the present embodiment can couple the optical signals, Sa to Sd, with the external fiber 120a efficiently.

Figure 12:
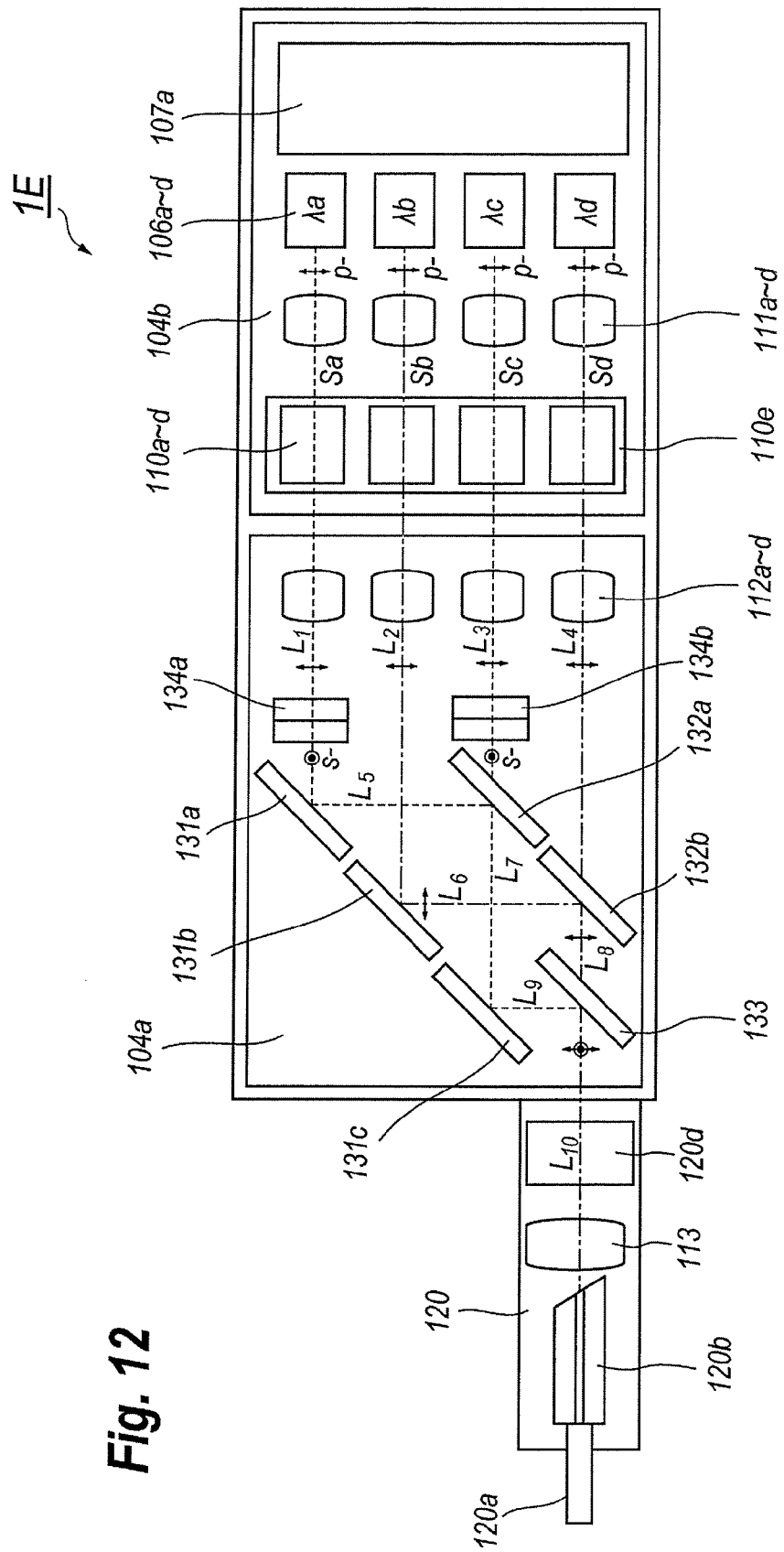
FIG. 12 shows an optical circuit according to an embodiment of the invention, where the optical circuit is still modified from those shown in FIG. 2.

FIG. 12 is a plan view of the optical circuit on the first base 104a implemented within an optical module 1E according to a further modified embodiment of the invention. The optical modules, 1 to 1D, provides only one PR 134 to rotate the polarization vector of the optical signals, Sa+Sc, multiplexed by the first WM 132a by 90°. While, the optical module 1E of the present embodiment provides two PRs, 134a and 134b, inserted just after the second lenses, 112a and 112c, where each of PRs, 134a and 134b, rotates the polarization vector of the optical signals, Sa and Sc, independently.

The optical signals, Sa and Sc, rotated in the polarization vector thereof by respective PRs, 134a and 134b, propagate along respective optical axes, $L_1$ and $L_3$. The former optical signal Sa, reflected by the first reflector 131a, propagates along the optical axis $L_5$, reflected by the first WM 132a, and propagates along the optical axis $L_7$. The third optical signal Sc, directly enters the first WM 132a, passes therethrough, and propagates along the optical axis $L_7$. Thus, the two optical signals, Sa and Sc, are multiplexed by the first WM 132a. The polarization vector of the optical signals, Sa and Sc, are not affected by the reflection by the first reflector 131a, or the transmission through the first WM 132a, and maintained in the s-polarization. Then, the PM 133 can multiplex two optical beams effectively, one of which includes the optical signals, Sa+Sc, with the s-polarization, and the other includes the optical signals, Sb+Sd, with the p-polarization with respect to the incident plane of the PM 133.

Figure 13:
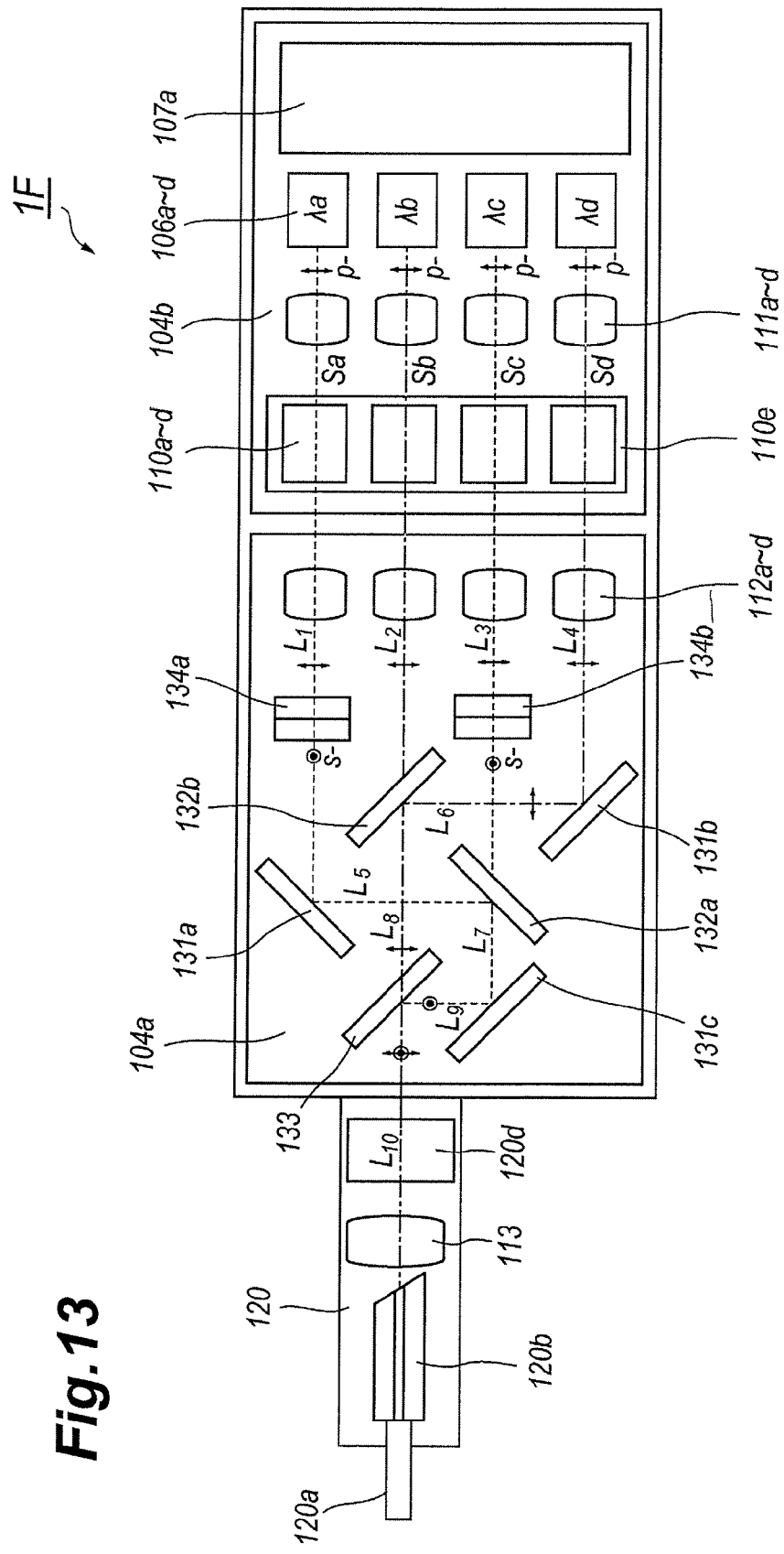
FIG. 13 shows an optical circuit according to an embodiment of the invention, where the optical circuit shown in FIG. 13 is further modified from those shown in FIG. 12.

FIG. 13 is a plan view of an optical circuit of still another modified optical module 1F. Features of the optical circuit shown in FIG. 13 is that the second optical signal Sb is multiplexed with the fourth optical signal Sd by passing through the second WM 132b. While, the second optical signal Sb in the aforementioned optical modules, 1 to 1E is multiplexed after it is reflected by the second reflector 131b. Accordingly, the optical axis $L_{10}$ is set in a position extending from the optical axis $L_2$. Then, the coupling unit 120 is assembled with the first wall 101a in substantially center thereof.

Figure 14A:
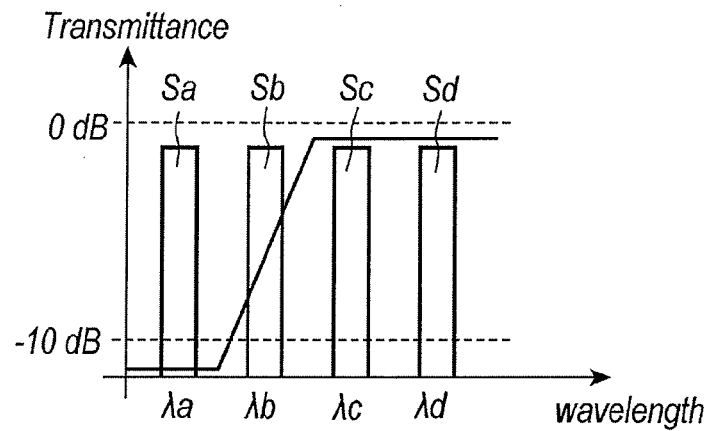
FIGS. 14A to 14C show optical transmittance of the optical reflector, the wavelength multiplexer, and the polarization multiplexer shown in FIG. 13.
Figure 14B:
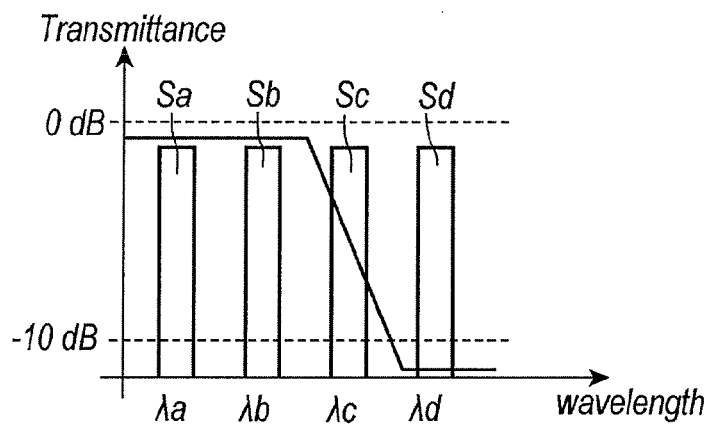
Figure 14C:
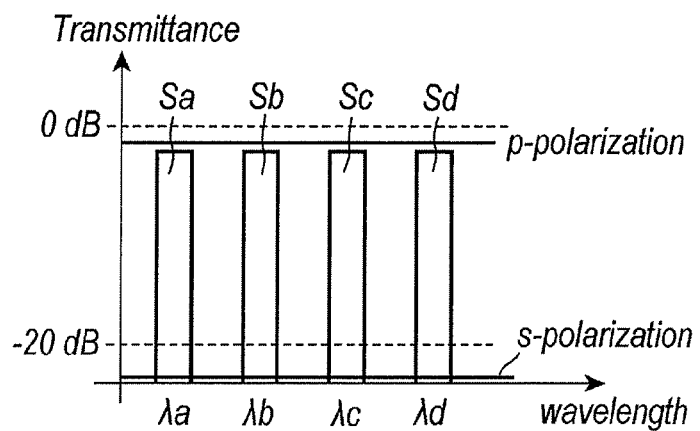

FIGS. 14A to 14C show optical properties, exactly the optical transmittance of two WMs, 132a and 132b, and the PM 133 implemented within the optical module 1F shown in FIG. 13. The first WM 132a shown in FIG. 14A behaves as, what is called, the high-pass filter to pass optical signals with longer wavelengths whose cut-off wavelength set halfway between two wavelengths, λa and λc, each corresponding to the first and third optical signals, Sa and Sc. Specifically, the cut-off wavelength of the first WM 132a is set around the wavelength λb of the second optical signal Sb. On the other hand, the second WM 132b shown in FIG. 14B behaves as a low-pass filter with the cut-off wavelength in a halfway between two wavelengths, λb and λd, corresponding to the second and fourth optical signals, Sb and Sd, respectively. Specifically, the cut-off wavelength of the second WM 132b is set around the third wavelength $\lambda_c$ of the third optical signals Sc. Even in such a combination of two WMs, 132a and 132b, that is, one of which is the high-pass filter while the other is the low-pass filter, the PM 133 can multiplex two optical beams, Sa+Sc and Sb+Sd, efficiently as shown in FIG. 14C, where the former optical beam has the s-polarization while the other has the p-polarization.

The optical module 1F shown in FIG. 13 has a distinguishable feature from those shown in FIGS. 2, 4, 6, 8, 10 and 12 that the former optical modules, 1 to 1E, provide two WMs, 132a and 132b, both of which behave as the high-pass filter. On the other hand, the present optical module 1F provides one WM 132a with the high-pass function but the other WM 132b has the low-pass function. The selection whether a WM has the function of the high-pass filter or the low-pass filter depends on the position of the filter. Specifically, the function of the WM depends on a condition which optical signal is transmitted or reflected. The second WM 132b in the former optical modules, 1 to 1E, reflects the second optical signal Sb but transmits the fourth optical signal Sd; while, the second WM 132b of the present optical module 1F reflects the fourth optical signal Sd but transmits the second optical signal Sb; which means that, by adjusting the function of the WMs, 132a and 132b, and the PM 133, the optical coupling unit 120 can be aligned in a position of the front 101a extended from any of the optical axes, $L_1$ to $L_4$, of the LDs, 106a to 106d.

While, the optical module 1F shown in FIG. 13 provides optical components of three reflectors, 131a to 131c, two WMs, 132a to 132b, the PM 133, independent to each other on the first base 104a; portions of those components can be integrated as the first to third intermediate assemblies, 136a to 136c, as shown in FIG. 4.

In the foregoing detailed description, the method and apparatus of the present invention have been described with reference to specific exemplary embodiments thereof. It will, however, be evident that various modifications and changes may be made thereto without departing from the broader spirit and scope of the present invention.

Figure 15:
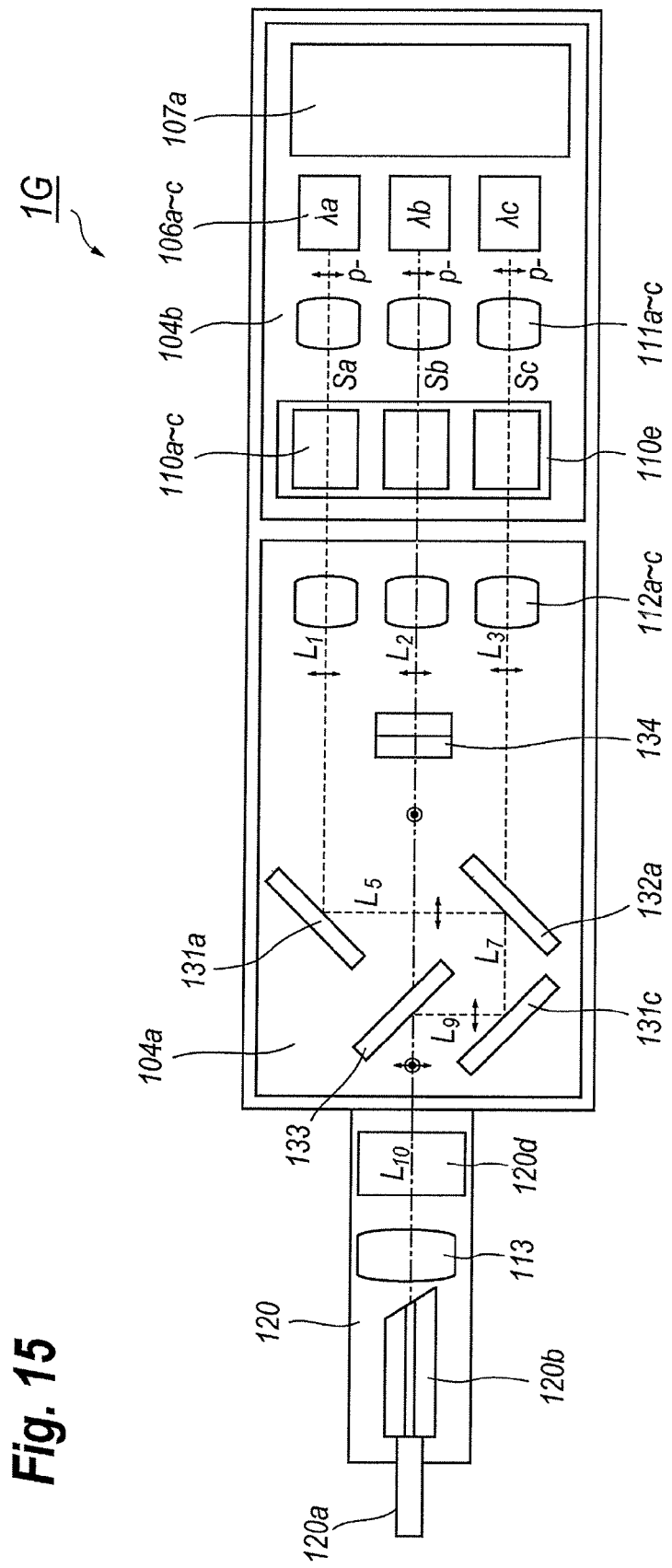
FIG. 15 shows an optical circuit further modified from those shown in FIG. 13.

For instance, FIG. 15 is a plan view of an optical module 1G according to a further modified embodiment of the invention. Aforementioned optical modules, 1 to 1F, provide four LDs, 106a to 106d, and optical signals, Sa to Sd, emitted from respective LDs, 106a to 106d, are multiplexed by rotating the polarization vector of half of them. However, the number of the optical sources is not limited to four (4). The modified optical module 1G shown in FIG. 15 provides three LDs, 106a to 106c, and the optical signals, Sa to Sc, emitted from respective LDs, 106a to 106c, are multiplexed by rotating the polarization vector of one of the optical signals, Sa to Sc, by 90°. Even in such an arrangement shown in FIG. 15, three optical signals, Sa to Sc, can be efficiently multiplexed. Thus, the present specification and drawings are accordingly to be regarded as illustrative rather than restrictive.

The present application is closely related to the following commonly-assigned U.S. Patent Applications: U.S. Ser. No. 13/391,716, entitled: OPTICAL MODULE HAVING FOCUSED OPTICAL COUPLING SYSTEM FOR SINGLE FIBER, filed Feb. 22, 2012; which is hereby incorporated by reference.

We claim:

1. An optical module, comprising:
    a first optical source for outputting a first optical signal having a first wavelength and a polarization vector;
    a second optical source for outputting a second optical signal having a second wavelength longer than the first wavelength and a polarization vector substantially same with the polarization vector of the first optical source;
    a third optical source for outputting a third optical signal having a third wavelength longer than the second wavelength and a polarization vector substantially same with the polarization vector of the first optical source and the polarization vector of the second optical source;
    a wavelength multiplexer for generating a multiplexed optical signal by transmitting one of the first optical signal and the third optical signal and reflecting another of the first optical signal and the third optical signal, the first optical signal and the third optical signal entering the wavelength multiplexer by an angle of 45° as forming a right angle therebetween, the wavelength multiplexer having a cut-off wavelength around the second wavelength;
    a polarization rotator for rotating the polarization vector of one of the multiplexed optical signal and the second optical signal by substantially 90°; and
    a polarization multiplexer for multiplexing the second optical signal with the multiplexed optical signal output from the polarization rotator by transmitting one of the multiplexed optical signal and the second optical signal and reflecting another of the multiplexed optical signal and the second optical signal, the second optical signal and the multiplexed optical signal entering the polarization multiplexer by an angle of 45° as forming a right angle therebetween,
    wherein the wavelength multiplexer has a multi-layered dielectric film formed on a base having a parallelogram plane shape with an acute angle corresponding to a Fresnel refraction angle of the one of the first optical signal and the third optical signal entering the wavelength multiplexer by an incident angle of 45°, the multi-layered dielectric film having a normal making an angle of 45° with respect to the first optical signal and the third optical signal.

2. The optical module of claim 1,
    further comprising an optical reflector to reflect one of the first optical signal and the third optical signal toward the wavelength multiplexer,
    wherein the wavelength multiplexer reflects one of the first optical signal and the third optical signal reflected by the optical reflector, and transmits the another of the first optical signal and the third optical signal.

3. The optical module of claim 2,
    wherein the optical reflector and the wavelength multiplexer are integrated with a block to form an intermediate assembly,
    wherein the block transmits one of the first optical signal and the third optical signal reflected by the optical reflector.

4. The optical module of claim 1,
    wherein one of the first optical signal and the third optical signal transmitted by the wavelength multiplexer is received in a center of one of sides of the parallelogram and outputted from a center of another sides of the parallelogram opposite the side.

5. The optical module of claim 1,
    further includes another optical reflector that reflects one of the multiplexed optical signal and the second optical signal,
    wherein the polarization multiplexer and the another optical reflector are integrated with another block to form another intermediate assembly.

6. The optical module of claim 5,
    wherein the another block shapes a parallelogram plane shape, one of the multiplexed optical signal and the second optical signal transmitted by the another block.

7. The optical module of claim 1,
    wherein the first to third optical signals are collimated beams.

8. The optical module of claim 1,
    wherein the wavelength multiplexer, the polarization rotator, and the polarization multiplexer are mounted on a thermo-electric cooler.

9. An optical module to output a wavelength multiplexed light, comprising:
    first to fourth optical sources to emit first to fourth optical signals each having first to fourth wavelengths, respectively, the first to fourth optical signals having a polarization vector same with each other, the first to fourth wavelengths being arranged in this order such that the first wavelength is shortest and the fourth wavelength is longest;
    a first wavelength multiplexer for generating a first multiplexed optical signal by multiplexing the first optical signal with the third optical signal, the first wavelength multiplexer making an angle of 45° with respect to the first optical signal and the third optical signal, the first optical signal making a right angle with respect to the third optical signal;
    a second wavelength multiplexer for generating a second multiplexed optical signal by multiplexing the second optical signal with the fourth optical signal, the second wavelength multiplexer making an angle of 45° with respect to the second optical signal and the fourth optical signal, the second optical signal making a right angle with respect to the fourth optical signal;
    a polarization rotator for rotating the polarization vector of one of the first multiplexed optical signal and the second multiplexed optical signal by substantially 90°; and
    a polarization multiplexer for generating the wavelength multiplexed light by multiplexing the one of the first and second multiplexed optical signal whose polarization vector is rotated by the polarization rotator with another of the first and second multiplexed optical signal whose polarization vector is not rotated by the polarization rotator,
    wherein at least one of the first wavelength multiplexer and the second wavelength multiplexer has a base having first to fourth faces forming a parallelogram plane shape, the first surface being in parallel to the third surface and the second surface being in parallel to the fourth surface, the third surface providing a multi-layered dielectric film to show a wavelength selective function, the first surface making an angle against one of the second surface and the fourth surface corresponding to a Fresnel refraction angle of an optical signal entering the first surface of the base, and
    wherein the first surface of the base receives the one of the first and second multiplexed optical signals by an angle of 45° in substantially a center thereof, and the third surface of the base receives another of the first and second multiplexed optical signal by an angle of 45° and outputs the wavelength multiplexed light in substantially a center thereof.

10. The optical module of claim 9, wherein the first to fourth optical signals are collimated beams.

11. The optical module of claim 9, wherein the first wavelength multiplexer has a cut-off wavelength around the second wavelength to reflect the one of the first optical signal and the third optical signal, and transmits the another of the first optical signal and the third optical signal.

12. The optical module of claim 9, further including a first reflector and a first block, the first reflector reflecting the one of the first optical signal and the third optical signal toward the first wavelength multiplexer, the first block having a parallelogram plane shape with first to third sides, the first side receiving the one of the first optical signal and the third optical signal, the second side providing the first reflector, the third side providing the first wavelength multiplexer, the first side and the third side forming an angle of substantially 45° with respect to the second side, wherein the first reflector, the first block, and the first wavelength multiplexer form a first intermediate assembly.

13. The optical module of claim 9, wherein the second wavelength multiplexer has a cut-off wavelength around the third wavelength to reflect one of the second optical signal and the fourth optical signal, and to transmit another of the second optical signal and the fourth optical signal.

14. The optical module of claim 13, further including a second reflector and a second block, the second reflector reflecting one of the second optical signal and the fourth optical signal toward the second wavelength multiplexer, the second block having a parallelogram plane shape with first to third sides, the first side of the second block receiving the one of the second optical signal and the fourth optical signal, the second side of the second block providing the second reflector, the third side of the second block being opposite to the second side of the second block and providing the second wavelength multiplexer, the first side of the second block forming an angle of substantially 45° with respect to the second side of the second block and the third side of the second block, wherein the second reflector, the second block, and the second wavelength multiplexer form a second intermediate assembly.

15. The optical module of claim 9, wherein the first and second wavelength multiplexers, the polarization rotator, and the polarization multiplexer are mounted on a thermo-electric cooler.

16. An optical module, comprising:
first to third optical sources each outputting first to third optical signals having first to third wavelengths different from others and polarization vectors substantially same with each other, respectively, the second wavelength being between the first wavelength and the third wavelength;
a wavelength multiplexer for generating a multiplexed optical signal by transmitting the first optical signal and reflecting the third optical signal, the first and third optical signals entering the wavelength multiplexer by an angle of 45° as forming a right angle therebetween, the wavelength multiplexer having a cut-off wavelength around the second wavelength;
a polarization rotator for rotating the polarization vector of the one of the multiplexed optical signal and the second optical signal by substantially 90°; and
a polarization multiplexer for multiplexing the second optical signal with the multiplexed optical signal output from the polarization rotator by transmitting one of the multiplexed optical signal and the second optical signal and reflecting another of the multiplexed optical signal and the second optical signal, the multiplexed optical signal and the second optical signal entering the polarization multiplexer by an angle of 45° as forming a right angle therebetween,
wherein the wavelength multiplexer, the polarization rotator, and the polarization multiplexer are mounted on a thermo-electric cooler.

* * * * *